United States Patent
Min et al.

(10) Patent No.: US 9,096,446 B2
(45) Date of Patent: Aug. 4, 2015

(54) WATER PURIFYING APPARATUS HAVING CLEANING SYSTEM

(75) Inventors: Deul-Re Min, Geumcheon-Gu (KR); Min-Je Cho, Geumcheon-Gu (KR); Young-Jin Kim, Geumcheon-Gu (KR); Sung-Yong Shin, Geumcheon-Gu (KR)

(73) Assignee: LG ELECTRONICS INC., Seoul (KR)

( * ) Notice: Subject to any disclaimer, the term of this patent is extended or adjusted under 35 U.S.C. 154(b) by 964 days.

(21) Appl. No.: 13/147,702

(22) PCT Filed: Jun. 24, 2009

(86) PCT No.: PCT/KR2009/003390
§ 371 (c)(1),
(2), (4) Date: Aug. 3, 2011

(87) PCT Pub. No.: WO2010/090379
PCT Pub. Date: Aug. 12, 2010

(65) Prior Publication Data
US 2011/0290706 A1    Dec. 1, 2011

(30) Foreign Application Priority Data
Feb. 6, 2009    (KR) .................. 10-2009-0009672

(51) Int. Cl.
*B01D 35/16*    (2006.01)
*C02F 9/00*    (2006.01)
*B01D 65/02*    (2006.01)
*C02F 1/28*    (2006.01)
*C02F 1/44*    (2006.01)

(52) U.S. Cl.
CPC ............ *C02F 9/005* (2013.01); *B01D 65/027* (2013.01); *C02F 1/283* (2013.01); *C02F 1/44* (2013.01); *C02F 1/441* (2013.01); *C02F 2201/006* (2013.01); *C02F 2209/005* (2013.01); *C02F 2209/40* (2013.01); *C02F 2209/42* (2013.01); *C02F 2209/44* (2013.01); *C02F 2303/14* (2013.01); *C02F 2303/16* (2013.01)

(58) Field of Classification Search
None
See application file for complete search history.

(56) References Cited

U.S. PATENT DOCUMENTS

| 5,722,447 | A | * | 3/1998 | Morgan et al. | ............... 137/1 |
| 6,267,886 | B1 | * | 7/2001 | Brandreth, III | ............ 210/206 |
| 2004/0245174 | A1 | | 12/2004 | Takayama et al. | |

(Continued)

FOREIGN PATENT DOCUMENTS

| CN | 1551856 A | 12/2004 |
| JP | 11-207333 A | 8/1999 |

(Continued)

*Primary Examiner* — Terry Cecil
(74) *Attorney, Agent, or Firm* — McKenna Long & Aldridge LLP (57) ABSTRACT

A water purifying apparatus comprises: a filtering unit; a water tank unit for storing water having passed through the filtering unit; an extraction unit for selectively extracting the water stored in the water tank unit; and a cleaning system for sequentially controlling a cleaning process and a rinsing process of the water tank unit. Since cleaning and rinsing processes for the water purifying apparatus are automatically executed by a series of consecutive processes, the user may directly clean the water purifying apparatus if necessary without requiring a Codi's visit.
Furthermore, the number of times that the Codi visits the users home for cleaning of the water purifying apparatus is reduced. This may allow the Codi to have an enhanced working efficiency, and to pay less effort to a cleaning process for the water purifying apparatus.

16 Claims, 10 Drawing Sheets

(56) References Cited

U.S. PATENT DOCUMENTS

| | | | |
|---|---|---|---|
| 2007/0199582 A1* | 8/2007 | Kroon | 134/56 R |
| 2011/0042417 A1* | 2/2011 | Kroon | 222/148 |

FOREIGN PATENT DOCUMENTS

| | | |
|---|---|---|
| JP | 2000-061463 A | 2/2000 |
| JP | 2000-254643 A | 9/2000 |
| KR | 20-0125215 Y1 | 5/1997 |
| KR | 10-2003-0042133 A | 5/2003 |
| KR | 10-0531667 | 11/2005 |
| KR | 10-2008-0039356 A | 5/2008 |
| KR | 10-0843153 B1 | 6/2008 |
| KR | 10-0843154 | 6/2008 |
| WO | 2005047170 A1 | 5/2005 |

* cited by examiner

WATER PURIFYING APPARATUS HAVING CLEANING SYSTEM

This application is a National Stage Entry of International Application No. PCT/KR2009/003390, filed Jun. 24, 2009, and claims the benefit of Korean Application No. 10-2009-0009672, filed on Feb. 6, 2009, all of the applications are hereby incorporated by reference for all purposes as if fully set forth herein.

TECHNICAL FIELD

The present invention relates to a water purifying apparatus, and more particularly, to a water purifying apparatus a cleaning system capable of removing contaminants accumulated on an inner part of the water purifying apparatus when the water purifying apparatus has been used for a long time.

BACKGROUND ART

Generally, a water purifying apparatus serves to filter harmful ingredients such as foreign materials or heavy metals included in water in a physical or chemical manner. A similar apparatus to the water purifying apparatus may include an ionized water apparatus, etc.

The water purifying apparatus may be largely divided into a filtering unit for filtering contaminants from raw water, a water tank unit for storing purified water having passed through the filtering unit, and a discharging unit for discharging the purified water stored in the water tank unit.

However, in the conventional water purifying apparatus, a function of the filtering unit may be degraded according to the usage time or the usage amount. And, inner components of the water purifying apparatus, especially, components through which water passes or in which water is stored may have water stains or contaminant stains accumulated thereon. This may result in pollution of a user's drinking water.

To prevent these problems, the water purifying apparatus has been cleaned by a special person who cleans components of the water purifying apparatus (so-called, 'Codi') periodically visits the water purifying apparatus purchaser's home or company, so as to replace the filter by a new one.

DISCLOSURE OF INVENTION

Technical Problem

However, in the conventional method for cleaning a water purifying apparatus by the Codi, a cleaning agent is put into the water tank unit, and then water stored in the water tank unit is discharged after a predetermined time has lapsed.

And, the cleaning agent remaining in the water tank unit is removed by supplying water to the water tank unit and then discharging out the water by a user under the Codi's instructions.

This may cause a cleaned degree of the water purifying apparatus to become different according to the Codi's skill.

In addition to these problems, the conventional method for cleaning a water purifying apparatus by the Codi has the following problems.

Firstly, purified water may have the odor of the cleaning agent even after a rinsing process has been completed, the rinsing process for supplying water to the water tank unit and then discharging the water so as to remove the cleaning agent. This may occur according to the user's skill.

Secondly, since the cleaning agent is introduced into the water tank unit, contaminants or water stains, etc. accumulated on filter connecting portions for sequentially connecting a plurality of filters thereto may not be easily removed.

Thirdly, whether a cleaning process using the cleaning agent put into the water tank unit has been completed or not is judged by the Codi's intuition or by lapse of time. In this case, the Codi has to be always concerned about his or her watch. When the judgment is performed based on the Codi's intuition, a difference value may occur in a cleaning degree.

Fourthly, when the user immediately uses the water purifying apparatus without following the Codi's instructions about the rinsing process, the user may drink water mixed with the odor of the cleaning agent. This may result in the user's dissatisfaction about the service or the product.

Technical Solution

Therefore, it is an object of the present invention to provide a water purifying apparatus having a cleaning system capable of consecutively performing a cleaning process using a cleaning agent, and a rinsing process.

Another object of the present invention is to provide a water purifying apparatus having a cleaning system capable of excluding a waiting process during a cleaning process and a rinsing process, and capable of solving a user's inconvenience occurring during a cleaning agent introduction process.

To achieve these and other advantages and in accordance with the purpose of the present invention, as embodied and broadly described herein, there is provided a water purifying apparatus, comprising: a filtering unit for filtering raw water supplied from a wellhead into purified water; a water tank unit for storing the purified water; an extraction unit for selectively extracting the purified water stored in the water tank unit; and a cleaning system for sequentially controlling a cleaning process and a rinsing process of the water tank unit.

The cleaning system may comprise a starting unit for discharging remaining water stored in the water tank unit, and controlling introduction of a cleaning agent into the water tank unit; a cleaning unit for sequentially controlling supply/storage/discharge cleaning water to/in/from the water tank unit; a rinsing unit for sequentially controlling supply/storage/discharge rinsing water to/in/from the water tank unit; and a discharging unit for discharging the remaining water, the cleaning water, and the rinsing water.

The discharging unit may comprise a discharging guide portion selectively communicated with the water tank unit or the extraction unit, for guiding the remaining water, the cleaning water or the rinsing water to be discharged out; and an opening/closing portion for selectively opening or closing the discharging guide portion.

The discharging unit may be implemented as a discharging pipe coupled to the end of an extraction opening of the extraction unit.

The starting unit may comprise a remaining water discharging unit for discharging the remaining water inside the water tank unit; and a cleaning agent introduction unit for controlling introduction of a cleaning agent into the water tank unit.

The remaining water discharging unit may comprise: a remaining water sensor for sensing whether there is remaining water or not; a remaining water discharge button portion for starting discharge of the remaining water by generating a remaining water discharge signal; and a remaining water discharge controller for activating the remaining water discharge button portion when there is remaining water, and transmitting a signal to the cleaning agent introduction unit when the remaining water has been completely discharged out.

The remaining water discharging unit may further comprise a remaining water discharge informing portion for informing discharge completion of the remaining water by sound.

The cleaning agent introduction unit may comprise an introduction instruction portion for instructing introduction of the cleaning agent into the water tank unit; and a cleaning agent introduction controller for transmitting a signal to the cleaning unit when it is sensed that the cleaning agent has been introduced into the water tank unit.

The cleaning agent introduction controller may be configured to sense introduction of the cleaning agent by a weight sensor provided at the water tank unit.

The cleaning agent introduction controller may be configured to sense introduction of the cleaning agent through an introduction completion input portion for inputting a signal indicating introduction completion of the cleaning agent from outside.

The cleaning unit may comprise: a cleaning water level sensor for sensing a level of the cleaning water stored in the water tank unit; and a cleaning controller for controlling water supply and disconnection until the cleaning water reaches a predetermined level, for discharging the cleaning water by sensing lapse of a preset time after the cleaning water has reached the predetermined level, and for transmitting a signal to the rinsing unit after the cleaning water has been completely discharged out.

The cleaning water level sensor may be implemented as one of a reed level sensor, a resistance sensor, a piezoelectric sensor, an ultrasonic sensor, an electrode sensor, and an infrared ray sensor.

The cleaning water level sensor may comprise a flow amount sensor for sensing a flow amount of the cleaning water supplied to the water tank unit; and a water level calculator for calculating a level of the cleaning water by sensing supply duration of the cleaning water.

The rinsing unit may comprise a rinsing water level sensor for sensing a level of the rinsing water stored in the water tank unit; and a rinsing controller for controlling water supply and disconnection until the rinsing water reaches a predetermined level, and for discharging the rinsing water by sensing lapse of a preset time after the rinsing water has reached the predetermined level.

The rinsing unit may further comprise a concentration sensor for sensing a concentration of the cleaning agent included in the rinsing water.

The rinsing controller may be configured to repeatedly perform a rinsing process until a concentration of the cleaning agent sensed by the concentration sensor becomes less than a preset concentration.

The filtering unit may comprise: filters; and a filter head having filter coupling portion for coupling the filters thereto. Flow paths for guiding water supplied to or discharged from the filters may be disposed in the filter head.

The cleaning agent introduction may be performed by replacing one of the filters by a cleaning agent vessel including the cleaning agent stored therein, and then by coupling the cleaning agent vessel to the filter coupling portion.

The filter and the filter coupling portion are formed in plurality in number, respectively. And, may be further comprised bypass caps coupled to the filter coupling portions to which the cleaning agent vessel has not been coupled, and communicating the flow paths with each other.

The water purifying apparatus of the present invention has the following advantages.

Firstly, the cleaning and rinsing processes for the water purifying apparatus may be automatically executed by a series of consecutive processes. Accordingly, a user may directly clean the water purifying apparatus if necessary without requiring a Codi's visit.

BEST MODE FOR CARRYING OUT THE INVENTION

Reference will now be made in detail to the preferred embodiments of the present invention, examples of which are illustrated in the accompanying drawings.

Hereinafter, a water purifying apparatus having a cleaning system according to a first embodiment of the present invention will be explained in more detail with reference to the attached drawings. The terms which will be later explained are defined with consideration of the functions of the present invention, which may be differently named according to a user, an operator's intention, or the convention. Therefore, the terms should be defined according to the present invention.

Figure 1:
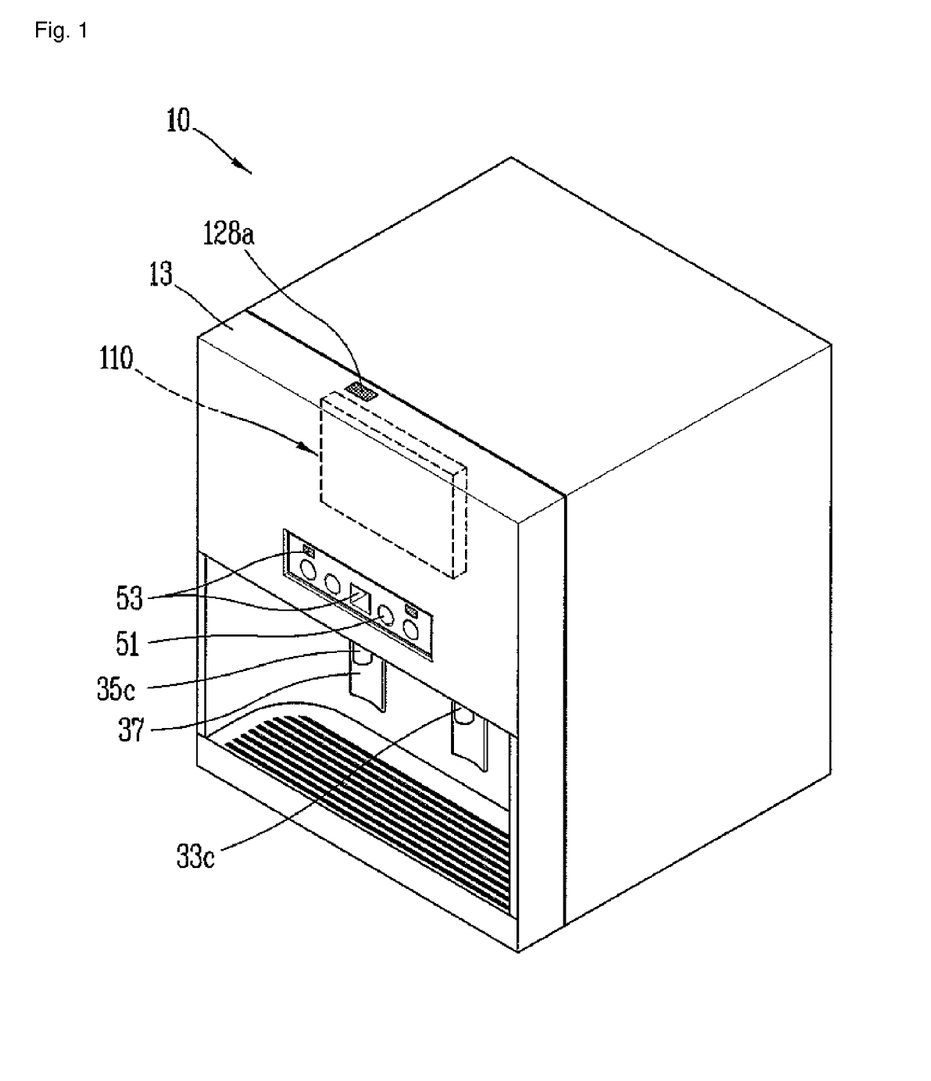
FIG. 1 is a frontal view of a water purifying apparatus having a cleaning system according to a first embodiment of the present invention.
Figure 2:
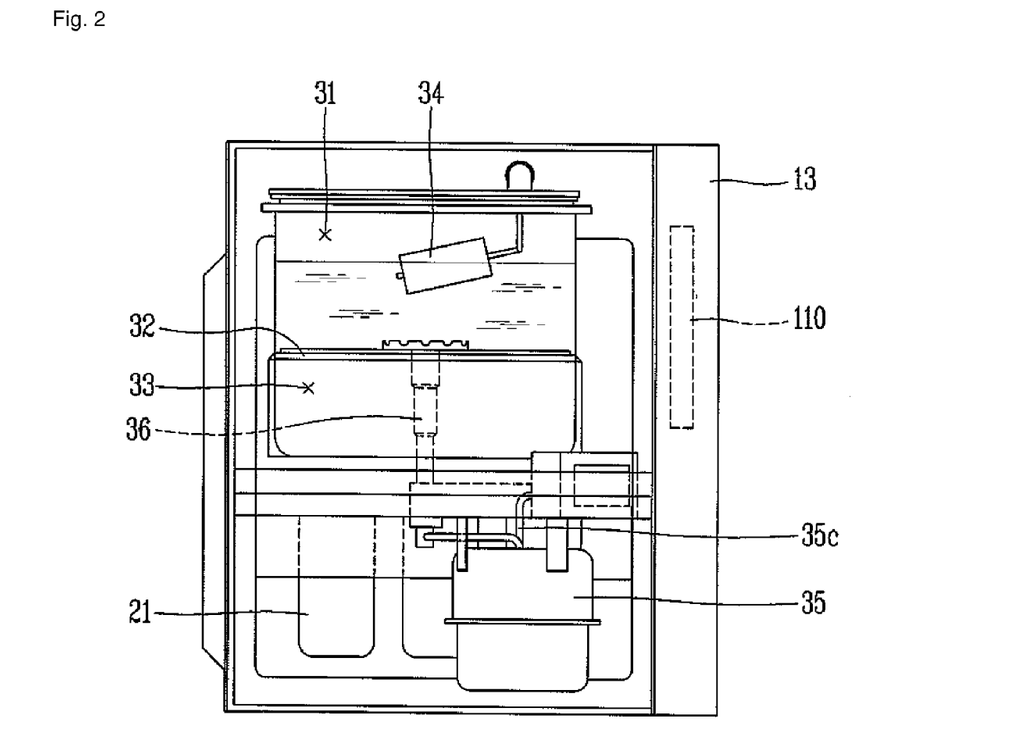
FIG. 2 is a view of a water tank unit of the water purifying apparatus having a cleaning system of FIG. 1.
Figure 3:
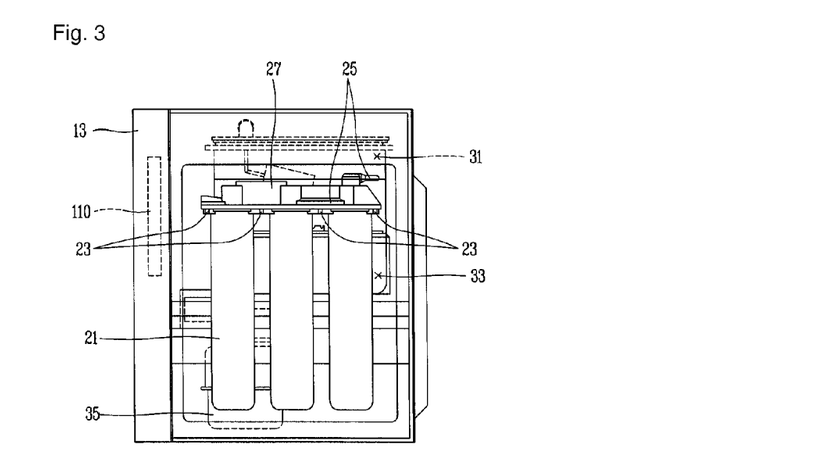
FIG. 3 is a view of a filtering unit of the water purifying apparatus of FIG. 1.
Figure 4:
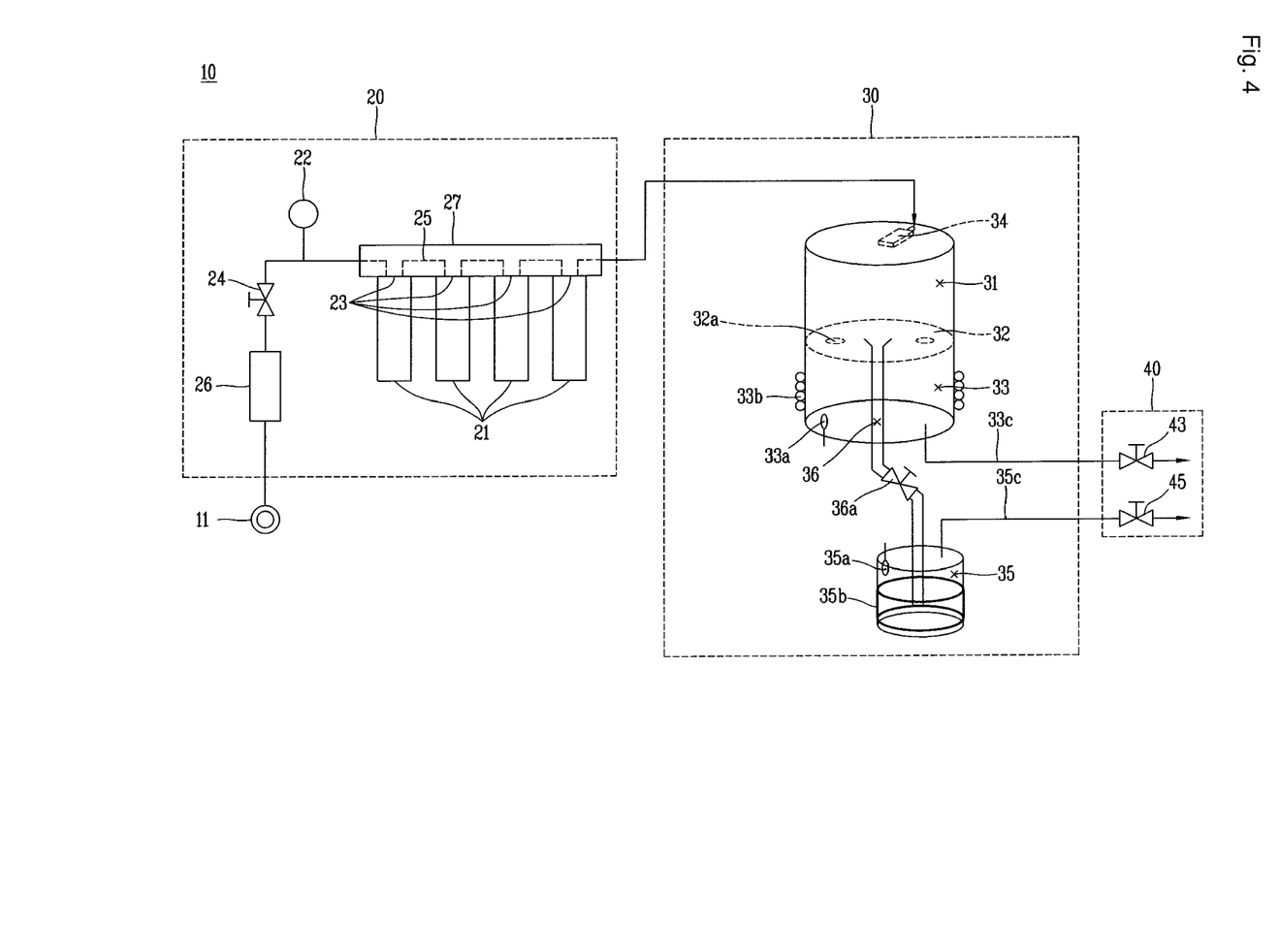
FIG. 4 is a piping diagram schematically showing the water purifying apparatus of FIG. 1.

FIG. 1 is a frontal view of a water purifying apparatus having a cleaning system according to a first embodiment of the present invention, FIG. 2 is a view of a water tank unit of the water purifying apparatus having a cleaning system of FIG. 1, FIG. 3 is a view of a filtering unit of the water purifying apparatus of FIG. 1, and FIG. 4 is a piping diagram schematically showing the water purifying apparatus of FIG. 1.

Referring to FIGS. 1 to 4, a water purifying apparatus 10 according to a first embodiment of the present invention comprises a filtering unit 20, a water tank unit 30, an extraction unit 40, and a cleaning system 100, each provided at a case 13 which forms the appearance.

The case 13 is generally formed in a hexahedron shape, but the shape of the case 13 of the present invention is not limited to this.

The case 13 is provided with the filtering unit 20, the water tank unit 30, etc. therein.

And, the extraction unit 40 is provided to be connected to the water tank unit 30 by a pipe, and to be exposed to a front surface of the case 13.

On a front surface of the case 13, further provided are an input unit 51 for receiving an operation signal of the water purifying apparatus 10 from outside, and a state displaying unit 53 for displaying a current state of the water purifying apparatus 10.

The input unit 51 may be implemented in the form of buttons, and the state displaying unit 53 may be implemented in the form of a 7-segment display, a liquid crystal display (LCD), and a light emitting diode (LED) display.

At an inner side of the case 13, may be disposed an integrated controller 110 for controlling the operation of the water purifying apparatus 10 through signal transmission to each component of the water purifying apparatus 10. The integrated controller 110 may be implemented as a printed circuit board (PCB) having a control circuitry.

The filtering unit 20 serves to filter raw water supplied from a wellhead 11 such as a faucet and a storage tank, into purified water.

And, the filtering unit 20 may include at least one filter 21, and a filter head 27 having filter coupling portions 23 for fixedly-coupling the filters 21 thereto. At the filter head 27, may be formed flow paths 25 through which raw water is supplied to the filters 21, and through which purified water discharged from the filters 21 is supplied to the water tank unit 30.

When the filter 21 is formed in plurality in number, the flow paths 25 may be configured to serially connect the plurality of filters 21 to the wellhead 11 and the water tank unit 30.

Differently from this, the filtering unit 20 may be implemented pipes for connecting said one or more inlets of the filters 21 to the wellhead 11, and connecting one or more outlets of the filters 21 to the water tank unit 30.

Here, the filters 21 may include sediment filters, pre-carbon filters, reverse osmosis membrane filters, post-carbon filters, ultra filtration filters, nano-filtration filters, etc.

The sediment filter is provided with a non-woven fabric, thereby filtering foreign materials and floating materials contained in the raw water.

The pre-carbon filter serves to filter chlorine or odor contained in the raw water by applying a surface activated carbon to the raw water.

The reverse osmosis membrane filter serves to filter minute particles having a size of about 0.001 μm.

The post-carbon filter has better absorption than the surface activated carbon of the pre-carbon filter 21b, thereby removing odors and tints.

The ultra-filtration filter is implemented as a thread-shaped membrane having a hollow center, thereby filtering bacteria contained in the raw water.

At the pipe which connects the wellhead 11 and the filtering unit 20, may be further provided a pre-filter 26 for removing contaminants in advance, the contaminants supplied to the filtering unit 20 to degrade the efficiency of the filters 21; a raw water supply valve 24 for controlling supply of raw water to the filtering unit 20; and a flow amount sensor 22 for measuring a flow amount of the raw water supplied to the filtering unit 20 so as to check the current state of the pre-filter 26 and so as to determine the time when to replace the pre-filter 26 by a new one.

The raw water supply valve 24 may be implemented as a gate valve, a cock valve, etc. that are manually opened and closed, or as a solenoid valve that is automatically opened and closed.

The water tank unit 30 may be implemented as a storage tank 31 for storing purified water having passed through the filtering unit 20. The storage tank 31 may be provided with a float valve 34 closed by a floating force when a predetermined amount of the purified water is stored in the storage tank 31.

Besides the storage tank 31, the water tank unit 30 may further include a cold water tank 33 and a hot water tank 35 configured to be communicated with the storage tank 31, respectively.

The cold water tank 33 may be disposed below the storage tank 31 by being integrally formed with the storage tank 31, or so as to be communicated with the storage tank 31 by being coupled to the storage tank 31. The water tank unit 30 may be further provided with a partition plate 32 configured to partition the storage tank 31 and the cold water tank 33 from each other, and having a purified water supplying hole 32a through which purified water stored in the storage tank 31 can be supplied to the cold water tank 33.

The hot water tank 35 may be implemented to be separately formed from the storage tank 31, but to be communicated with the storage tank 31. Alternatively, the hot water tank 35 may be implemented to be communicated with the storage tank 31, and configured to receive purified water through a purified-water supplying pipe 36 extending from the partition plate 32.

At the purified-water supplying pipe 36, may be further provided a hot water amount control valve 36a for controlling the amount of purified water supplied to the hot water tank 35.

The amount of cold water stored in the cold water tank 33 is controlled by the float valve 34, while the amount of hot water stored in the hot water tank 35 is controlled by the hot water amount control valve 36a.

For cooling of purified water stored in the cold water tank 33, a heat exchanger 33b (e.g., evaporator) may be wound on the outer circumference of the cold water tank 33. And, a heater 35b for heating purified water stored in the hot water tank 35 is wound on the outer circumference of the hot water tank 35.

For an enhanced heat exchange rate, the heat exchanger 33b and the heater 35b may be disposed inside the cold water tank 33 and the hot water tank 35.

A cold water sensor 33a and a hot water sensor 35a for sensing temperatures of cold water and hot water stored in the cold water tank 33 and the hot water tank 35 may be disposed at the cold water tank 33 and the hot water tank 35, respectively. Each operation of the heat exchanger 33b and the heater 35b may be controlled based on the temperatures of cold water and hot water sensed by the cold water sensor 33a and the hot water sensor 35a.

The hot water tank 35 is separately disposed from the storage tank 31 and the cold water tank 33, in order to prevent lowering of a cooling efficiency by the cold water tank 33, or multiplication of contaminants inside purified water stored in the storage tank 31, each due to heat from the heater 35b.

In order to prevent lowering of the cooling efficiency of the cold water tank 33, may be further provided a partition plate 32 configured to partition the storage tank 31 and the cold water tank 33 from each other, and configured to partition the storage tank 31 and the hot water tank 35 from each other, so as to prevent heat exchange due to convection.

The extraction unit 40 may include a cold water pipe 33c and a hot water pipe 35c connected to the cold water tank 33 and the hot water tank 35, respectively, and each extending to be exposed to a front surface of the case 13; opening/closing valves 43, 45 for opening and closing the cold water pipe 33c and the hot water pipe 35c, respectively; and a lever portion 37 for generating operation signals of the opening/closing valves 43, 45.

The opening/closing valves 43, 45 may be implemented as solenoid valves opened and closed by receiving electric inputs, as well as cock valves and mechanical valves.

The cleaning system 100 sequentially controls a cleaning process and a rinsing process for the water tank unit 30 by receiving a cleaning process start signal from outside.

The structure and function of each component of the cleaning system 100 will be explained in more detail with reference to FIG. 5.

Figure 5:
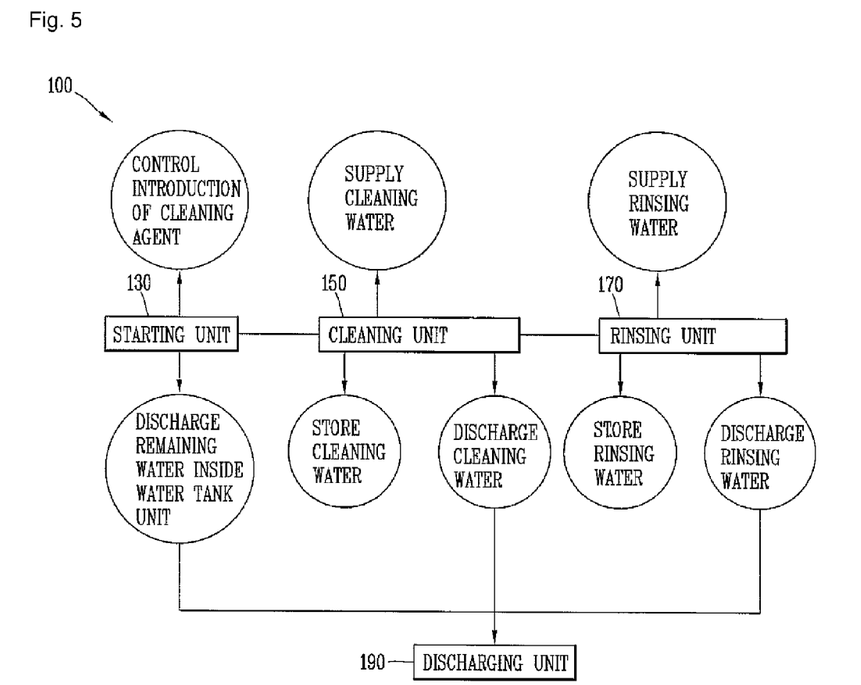
FIG. 5 is a block diagram showing a structure and a function of a cleaning system of the water purifying apparatus of FIG. 1.

FIG. 5 is a block diagram showing a structure and a function of the cleaning system of the water purifying apparatus of FIG. 1.

Referring to FIG. 5, the cleaning system 100 includes a starting unit 130 for preparing a cleaning process; a cleaning unit 150 for performing a cleaning process by using a cleaning agent; a rinsing unit 170 for removing the cleaning agent; and a discharging unit 190 for discharging water generated during the cleaning process.

Once a cleaning process start signal is input from outside, the starting unit 130 discharges out the remaining water stored in the water tank unit 30, and introduces the cleaning agent into the water tank unit 30.

The starting unit 130 includes a remaining water discharging unit 120 for discharging the remaining water inside the water tank unit 30; and a cleaning agent introduction unit 140 for instructing a user or a Codi to introduce the cleaning agent into the water tank unit 30, and sensing whether the cleaning agent has been introduced. A detailed description about this will be later explained.

The cleaning unit 150 supplies water to the water tank unit 30, and stops the water supply by sensing a level of the cleaning water in which the cleaning agent has dissolved. And, the cleaning unit 150 serves to allow the cleaning water to remain in the water tank unit 30 for a preset time, so as to perform a cleaning process.

For this, the cleaning unit 150 includes a cleaning water level sensor 154 for sensing a level of the cleaning water; a valve portion 156 for controlling water supply to the water tank unit 130 and disconnection of the water supply; and a time sensor 158 for sensing a time duration for which the cleaning water has remained in the water tank unit 30. A detailed description about this will be later explained.

The rinsing unit 170 serves to remove the cleaning agent having not been dissolved during the cleaning process, and to remove the cleaning water having not been discharged out but remaining on a wall of the water tank unit 30. The rinsing unit 170 supplies rinsing water having passed through the filtering unit 20 to the water tank unit 30. Once a level of the rinsing water supplied to the water tank unit 30 reaches a preset level, the rinsing unit 170 stops the supply of the rinsing water, and allows the rising water to remain in the water tank unit 30 for a preset time.

For this, the rinsing unit 170 includes a rinsing water level sensor 174, a valve portion 176, and a time sensor 178, in a similar manner as the cleaning unit 150. A detailed description about this will be later explained.

Hereinafter, the structure of each component of the starting unit 130 will be explained in more detail with reference to FIG. 6.

Figure 6:
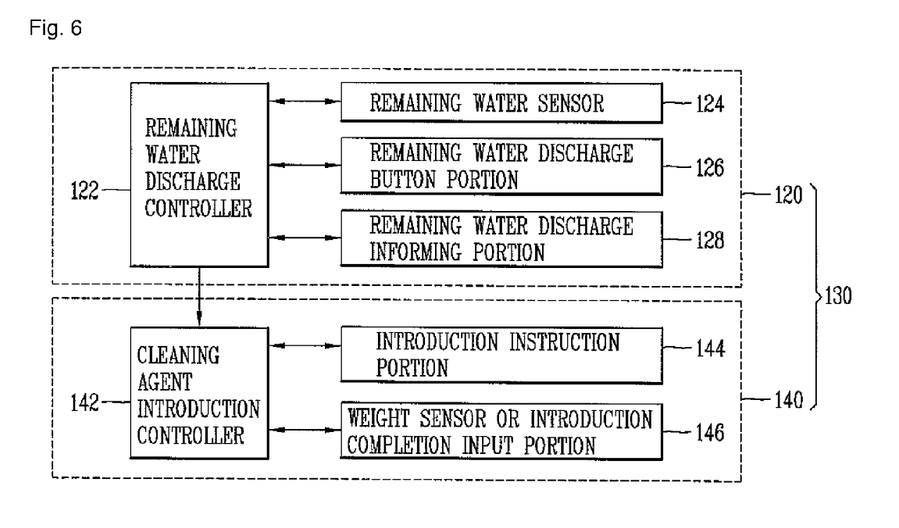
FIG. 6 is a block diagram schematically showing a starting unit of the cleaning system of FIG. 5.

FIG. 6 is a block diagram schematically showing the starting unit of the cleaning system of FIG. 5.

Referring to FIG. 6, as aforementioned, the starting unit 130 includes a remaining-water discharging unit 120, and a cleaning agent introduction unit 140.

The remaining water discharging unit 120 includes a remaining water sensor 124 for sensing whether there is remaining water in the water tank unit 30 or not; a remaining water discharge button portion 126 for starting discharge of the remaining water by generating a remaining water discharge signal; and a remaining water discharge controller 122 for activating the remaining water discharge button portion 126 when there is remaining water, and transmitting a signal to the cleaning agent introduction unit 140 when the remaining water has been completely discharged out.

The remaining water sensor 124 may be implemented as a sensor for sensing a level of the storage tank 31, the cold water tank 33, and the hot water tank 35 of the water tank unit 30, or may be implemented as a sensor disposed on a bottom surface of the water tank unit 30 for sensing whether moisture exists on the bottom surface.

For instance, the remaining water sensor 124 may be implemented as a reed level sensor disposed at an inner surface of the water tank unit 30 for sensing a level by a magnetic force occurring due to buoyancy, a resistance sensor using a variation amount of a resistance, a piezoelectric device using an electric signal generated when deformation due to a load occurs, a ultrasonic sensor, an electrode sensor, an infrared ray sensor, etc.

Since the remaining water sensor 124 does not sense a level of water, differently from the cleaning water level sensor 154 and the rinsing water level sensor 174 that will be later explained, it may be additionally provided. However, for reduced costs, may be provided one water level sensor that ca serve as the remaining water sensor 124 as well as the cleaning water level sensor 154 and the rinsing water level sensor 174.

The remaining water discharge button portion 126 is activated by the remaining water discharge controller 122 when the remaining water sensor 124 has sensed the existence of the remaining water, thereby generating a discharge signal to operate the discharging unit 190.

The remaining water discharge button portion 126 may be implemented as one of buttons that serve as the input unit 51 for inputting an operation signal of the water purifying apparatus 10 from outside.

The remaining water discharging unit 120 may further include a remaining water discharge informing portion 128 for informing discharge completion of the remaining water to outside.

The remaining water discharge informing portion 128 is configured to inform discharge completion of the remaining water to outside in a visual or auditory manner. The visual manner may be implemented by the state displaying unit 53 disposed on a front surface of the case 13. And, the auditory manner may be implemented by a sound generator 128a such as a speaker disposed at one side of the case 13.

Without the remaining water discharge informing portion 128, the cleaning agent introduction unit 140 is sequentially operated by the remaining water discharge controller 122. However, since the user or the Codi can check from outside whether the remaining water has been completely discharged out by the remaining water discharge informing portion 128, whether a cleaning process is being normally performed can be checked. This may enhance the user's sensuous satisfaction degree for the product.

The cleaning agent introduction unit 140 includes an introduction instruction portion 144 for instructing introduction of the cleaning agent into the water tank unit 30, and a cleaning agent introduction controller 142 for transmitting a cleaning agent introduction completion signal to the cleaning unit 150 after sensing that the cleaning agent has been completely introduced into the water tank unit 30.

The introduction instruction portion 144 is operated by the cleaning agent introduction controller 142. More concretely, once the cleaning agent introduction controller 142 receives a remaining water discharge completion signal from the remaining water discharge controller 122, the introduction instruction portion 144 instructs the user or the Codi to introduce the cleaning agent into the water tank unit 30.

Like the remaining water discharge informing portion 128, the introduction instruction portion 144 may be implemented as the sound generator 128a or the state displaying unit 53 each provided at the case 13.

Preferably, the state displaying unit 53 or the sound generator 128a is controlled to serve as the introduction instruction portion 144 as well as the remaining water discharge informing portion 128.

The cleaning agent introduction controller 142 senses whether the cleaning agent has been introduced, and an introduction amount by a weight sensor provided at one side of the water tank unit 30. Accordingly, a cleaning agent introduction completion signal is transmitted to the cleaning unit 150.

Alternatively, the cleaning agent introduction controller 142 may be implemented to transmit a cleaning agent introduction completion signal to the cleaning unit 150 by receiving a cleaning agent introduction completion signal from outside (user or Codi).

In this case, provided is an introduction completion input portion 146 for inputting a cleaning agent introduction completion signal from outside. Like the remaining water discharge button portion 126, the introduction completion input portion 146 may be implemented as one of buttons that serve as the input unit 51 for inputting an operation signal of the water purifying apparatus 10 from outside.

Hereinafter, the cleaning unit 150 will be explained in more detail with reference to FIG. 7.

Figure 7:
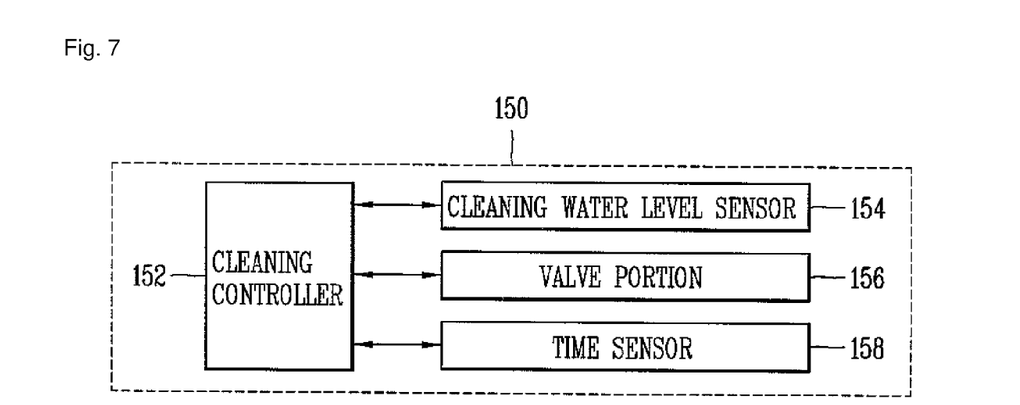
FIG. 7 is a block diagram schematically showing a cleaning unit of the cleaning system of FIG. 5.

FIG. 7 is a block diagram schematically showing a cleaning unit of the cleaning system of FIG. 5.

Referring to FIG. 7, the cleaning unit 150 includes a cleaning water level sensor 154 for sensing a level of the cleaning water having the cleaning agent dissolved therein, and a cleaning controller 152 for controlling the operation of the cleaning unit 150.

The cleaning water level sensor 154 may be implemented as a reed level sensor, a resistance sensor, a piezoelectric device, a ultrasonic sensor, an electrode sensor, an infrared ray sensor, etc. so as to also serve as the remaining water sensor 124.

Differently from this, the cleaning water level sensor 154 may include a flow amount sensor for sensing a flow amount of water supplied to the water tank unit 30, and a water level calculator for calculating a water level by sensing supply duration.

Preferably, the flow amount sensor is disposed at a pipe through which water is supplied to the storage tank 31, among the storage tank 31, the cold water tank 33, and the hot water tank 35 of the water tank unit 30.

The cleaning controller 152 controls water supply and disconnection thereof until the cleaning water reaches a predetermined level, and discharges out the cleaning water by sensing lapse of a preset time after the cleaning water has reached the predetermined level. And, the cleaning controller 152 transmits a signal to the rinsing unit 170 after the cleaning water has been completely discharged out.

Here, the water supply and disconnection may be performed by providing the valve portion at a pipe through which water is supplied to the water tank unit 30. Alternatively, the water supply and disconnection may be performed by controlling the raw water supply valve 24.

A time duration for which the cleaning water for a cleaning process remains in the water tank unit 30 may be checked by the time sensor 158 for sensing time lapse after the valve portion 156 has been closed.

Whether the cleaning water has been completely discharged out may be sensed by the remaining water sensor 124 or the cleaning water level sensor 154.

Hereinafter, the rinsing unit 170 will be explained in more detail with reference to FIG. 8.

Figure 8:
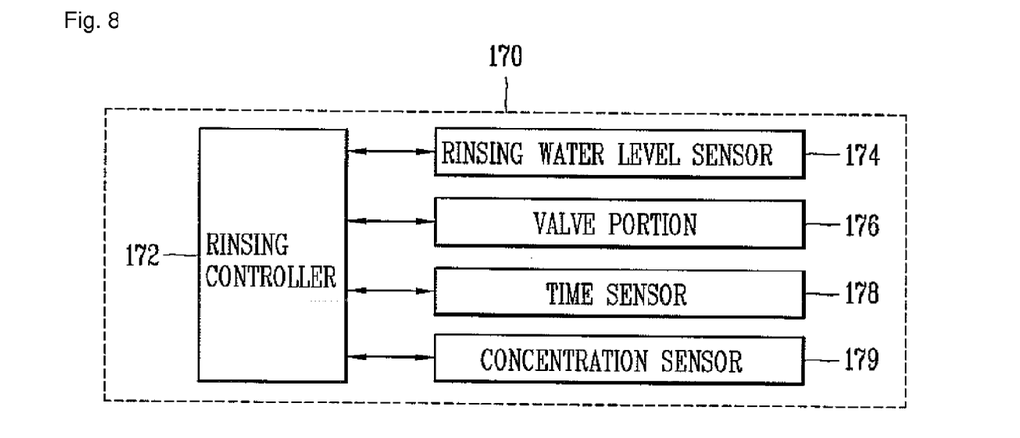
FIG. 8 is a block diagram schematically showing a rinsing unit of the cleaning system of FIG. 5.

FIG. 8 is a block diagram schematically showing the rinsing unit of the cleaning system of FIG. 5.

Referring to FIG. 8, the rinsing unit 170 includes a rinsing water level sensor 174 for sensing a level of the rinsing water stored in the water tank unit 30; and a rinsing controller 172 for controlling water supply and disconnection until the rinsing water reaches a predetermined level, and for discharging the rinsing water by sensing lapse of a preset time after the rinsing water has reached the predetermined level.

The structures and operations of the rinsing water level sensor 174 and the rinsing controller 172 are almost the same as those of the cleaning water level sensor 154 and the cleaning controller 152, and thus their detailed descriptions will be omitted.

Here, the rinsing unit 170 may further include a concentration sensor 179 for sensing a concentration of the cleaning agent included in the rinsing water.

Since the cleaning agent is formed of chlorine (Cl)-based material, the concentration sensor 179 may be implemented as a sensor for sensing a concentration of chlorine occurring during a cleaning process.

Preferably, the concentration sensor 179 is provided at the discharging unit 190, and allows the rinsing controller 172 to control the rinsing process based on a concentration sensed by the concentration sensor 179.

The rinsing controller 172 may be configured to repeatedly perform a rinsing process until a concentration of the cleaning agent sensed by the concentration sensor 179 becomes less than a preset concentration.

Alternatively, the concentration sensor 179 may be implemented as a concentration sensing device separately installed from the water purifying apparatus 10. In this case, the concentration of chlorine may be passively checked by the user or the Codi after the rinsing process, thereby preventing a problem that the user may drink water having the odor of chlorine.

Figure 9:
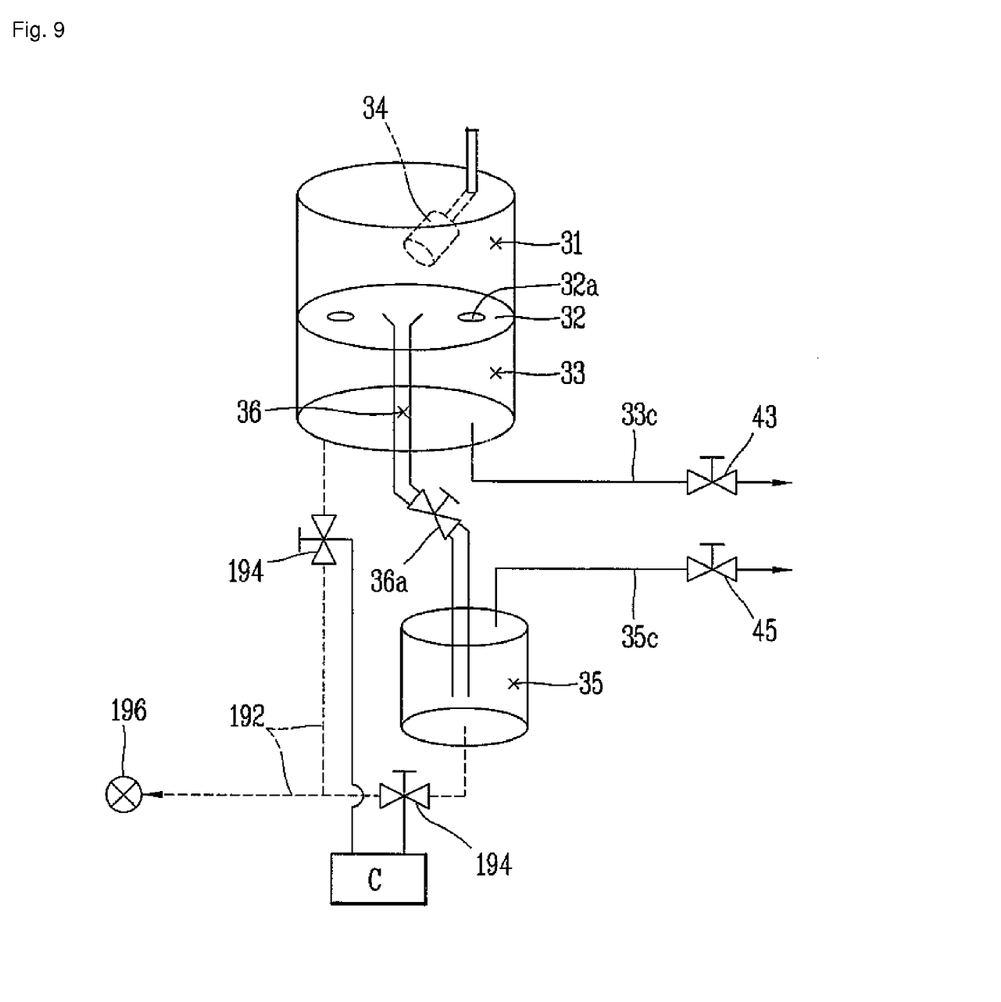
FIG. 9 is a block diagram schematically showing a discharging unit of the cleaning system of FIG. 5.
Figure 10:
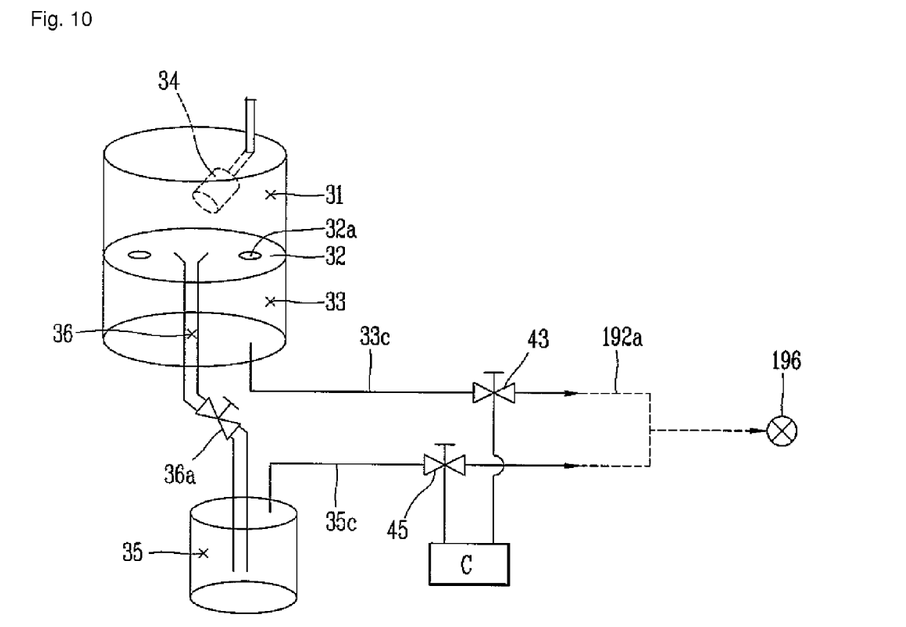
FIG. 10 is a view showing a modification example of the discharging unit of FIG. 9.

FIG. 9 is a block diagram schematically showing the discharging unit of the cleaning system of FIG. 5, and FIG. 10 is a view showing a modification example of the discharging unit of FIG. 9.

Referring to FIG. 9, the discharging unit 190 includes a discharging guide portion 192 selectively communicated with the water tank unit 30 or the extraction unit 40, for guiding the remaining water, the cleaning water or the rinsing water to be discharged out; and an opening/closing portion 194 for selectively opening or closing the discharging guide portion 192.

One end of the discharging guide portion 192 may be configured to be communicated with inside of the cold water tank 33 and the hot water tank 35 of the water tank unit 30, or to be communicated with inside of the cold water pipe 33c and the hot water pipe 35c of the extraction unit 40. And, another end of the discharging guide portion 192 may be implemented as a pipe connected to an external position 196 of the case 13 (e.g., home sink, drain, etc.).

The opening/closing portion 194 is provided at one side of the discharging guide portion 192, and is opened or closed by the remaining water discharge controller 122, the cleaning controller 152, and the rinsing controller 172.

Referring to FIG. 10, the discharging unit 190 may be implemented as a discharging pipe 192a coupled to the end of the cold water pipe 33c and the hot water pipe 35c, that is, an extraction opening of the extraction unit 40.

In this case, the coupling of the discharging pipe 192a is passively performed by the user or the Codi, and is preferably performed before starting a cleaning process or before discharging the remaining water.

That is, before discharging the remaining water, the user or the Codi may be instructed to perform the coupling process, through the sound generator 128a or the state displaying unit 53.

The discharge of the remaining water, the cleaning water, or the rinsing water through the discharging pipe 192a may be performed by controlling the opening/closing valves 43, 45 for opening or closing the cold water pipe 33c and the hot water pipe 35c, respectively.

The remaining water discharge controller 122, the cleaning agent introduction controller 142, the cleaning controller 152, and the rinsing controller 172 may constitute the integrated controller 110.

Hereinafter, the water purifying apparatus having a cleaning system according to a second embodiment of the present invention will be explained in more detail with references to FIGS. 11 to 14.

The same structure as that of the first embodiment, and its detailed explanations will be omitted.

Figure 11:
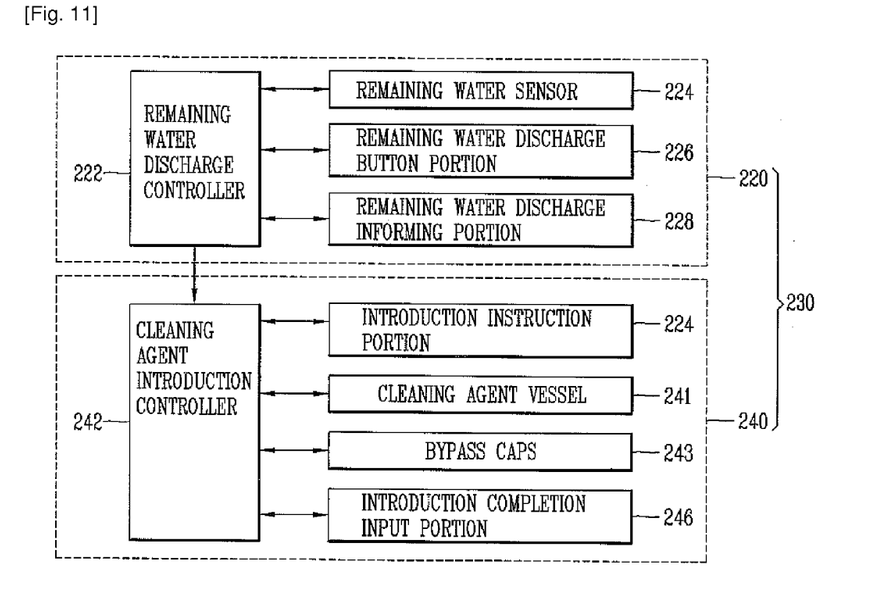
FIG. 11 is a block diagram schematically showing a construction of a starting unit of a water purifying apparatus having a cleaning system according to a second embodiment of the present invention.
Figure 12:
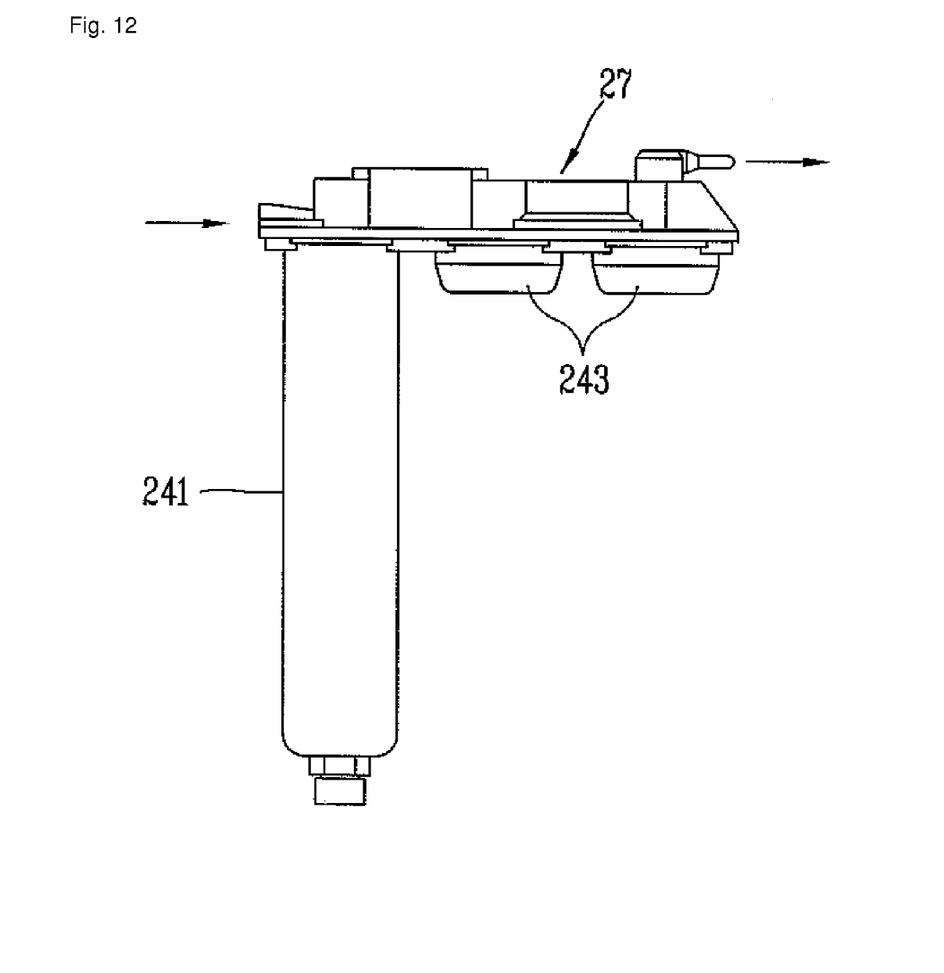
FIG. 12 is a view showing one coupled example between a cleaning agent vessel and bypass caps of FIGS. 11.
Figure 13:
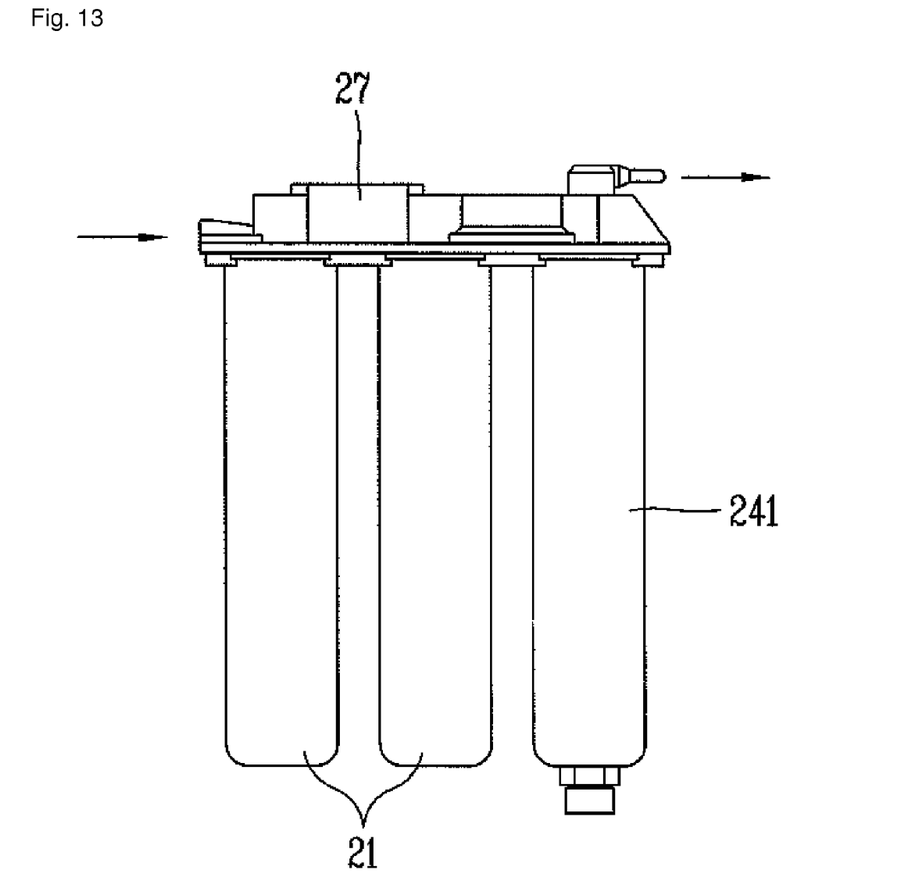
FIGS. 13 and 14 are views showing another coupled example between a cleaning agent vessel and bypass caps of FIG. 11.
Figure 14:
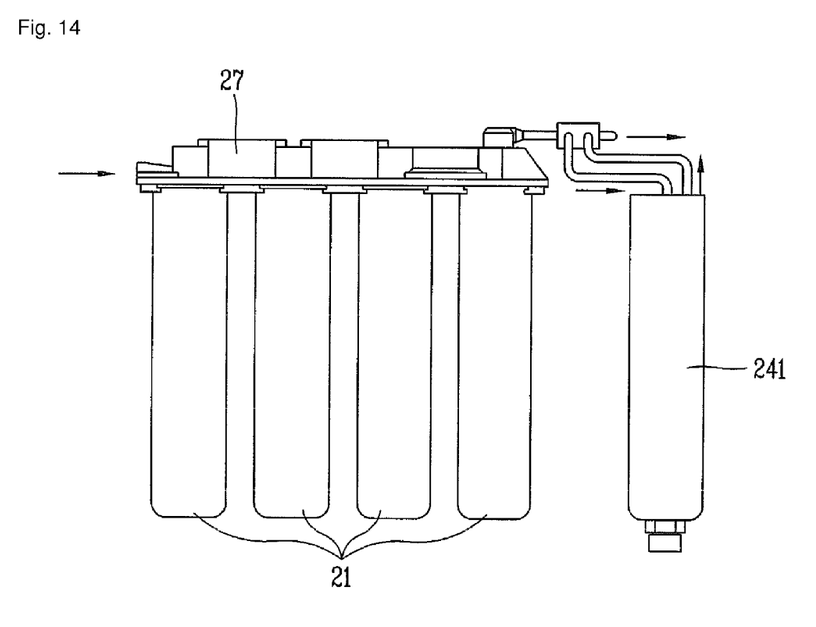

FIG. 11 is a block diagram schematically showing a construction of a starting unit of a water purifying apparatus having a cleaning system according to a second embodiment of the present invention, and FIG. 12 is a view showing one coupled example between a cleaning agent vessel and bypass caps of FIG. 11, and FIGS. 13 and 14 are views showing another coupled example between a cleaning agent vessel and bypass caps of FIG. 11.

In the water purifying apparatus having a cleaning system according to a second embodiment 10, the cleaning system 200 comprises a starting unit 23, a cleaning unit 250, and a rinsing unit 270. Here, the cleaning unit 250 and the rinsing unit 270 have almost the same construction and operation as those of the first embodiment. Accordingly, only the starting unit 230 will be explained.

Referring to FIG. 11, the starting unit 230 includes a remaining water discharging unit 220, and a cleaning agent introduction unit 240.

The remaining water discharging unit 220 includes a remaining water sensor 224 for sensing whether there is remaining water or not; a remaining water discharge button portion 226 for starting discharge of the remaining water by generating a remaining water discharge signal; and a remaining water discharge controller 222 for activating the remaining water discharge button portion 226 when there is remaining water, and transmitting a signal to the cleaning agent introduction unit 240 when the remaining water has been completely discharged out. Detailed explanations for the remaining water discharging unit 220 will be omitted.

The cleaning agent introduction unit 240 includes an introduction instruction portion 244 for instructing introduction of the cleaning agent into the water tank unit 30, and a cleaning agent introduction controller 242 for transmitting a cleaning agent introduction completion signal to the cleaning unit 250 after sensing that the cleaning agent has been completely introduced into the water tank unit 30. However, differently from the first embodiment, the cleaning agent introduction unit 240 of the second embodiment further includes a cleaning agent vessel 241 having the cleaning agent stored therein.

In the second embodiment, the introduction of the cleaning agent is completed by coupling the cleaning agent vessel 241 to the filter coupling portion 23.

In this case, whether the cleaning agent has been completely introduced into the water tank unit 30 is preferably checked as the user or the Codi inputs completion information from outside.

That is, preferably provided is an introduction completion input portion 246 for inputting a cleaning agent introduction completion signal from outside. Like the remaining water discharge button portion 226, the introduction completion input portion 246 may be implemented as one of buttons that serve as the input unit 51 for inputting an operation signal of the water purifying apparatus 10 from outside.

Once introduction of the cleaning agent into the water tank unit 30 is instructed by the introduction instruction portion 244, the cleaning agent vessel 241 is replaced by the filter 21 by the user or the Codi, and an introduction completion signal is transmitted to the cleaning agent introduction controller 242 through the introduction completion input portion 246.

Referring to FIG. 12, when the filter 21 is formed in plurality in number, the cleaning agent vessel 241 is coupled to one of the filter coupling portions 23, and bypass caps 243 configured to communicate the flow paths 25 with each other is coupled to the rest filter coupling portions 23.

Preferably, the cleaning agent vessel 241 is coupled to the filter coupling portion 23 to which water from the wellhead 11 is firstly supplied.

Under these configurations, the cleaning water supplied to the cleaning agent vessel 241 and having the cleaning agent dissolved therein is supplied to the water tank unit 30 through all the flow paths 25 of the filter head 27. This may enable the flow paths 25 to be cleaned.

Referring to FIGS. 13 and 14, another example to couple the cleaning agent vessel 241 to the filter head 27 will be explained.

Firstly, one of the filters 21 coupled to the filter coupling portions 23 may be replaced by the cleaning agent vessel 241. Here, in order to prevent the cleaning water having the cleaning agent dissolved therein from being supplied to the filters 21, the rearmost filter 21 in a water supply direction to the water tank unit 30 is preferably replaced by the cleaning agent vessel 241.

Next, an inlet and an outlet of the cleaning agent vessel 241 may be connected to the flow paths of the filter head 27 without separating the filters 21 coupled to the filter coupling portions 23 from the filter coupling portions 23. In this case, water conventionally supplied to the water tank unit 30 via the filters 21 is introduced into the inlet of the cleaning agent vessel 241, thereby being supplied to the water tank unit 30.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A water purifying apparatus, comprising:
a filtering unit;
a water tank unit for storing water having passed through the filtering unit;
an extraction unit for selectively extracting the water stored in the water tank unit; and
a cleaning system for sequentially controlling a process of introducing a cleaning agent, a cleaning process and a rinsing process of the water tank unit, and a process of discharging cleaning water and rinsing water,
wherein the cleaning system comprises:
  a remaining water discharging unit for discharging remaining water inside the water tank unit;
  a cleaning agent introduction unit for controlling introduction of the cleaning agent into the water tank unit;
  a cleaning unit for sequentially controlling supply/storage/discharge cleaning water to/in/from the water tank unit;
  a rinsing unit for sequentially controlling supply/storage/discharge rinsing water to/in/from the water tank unit; and
  a discharging unit for discharging the remaining water, the cleaning water, and the rinsing water,
  wherein the remaining water discharging unit comprises a remaining water discharge controller for transmitting a signal to the cleaning agent introduction unit when the remaining water has been completely discharged out,
wherein the filtering unit comprises:
filters; and
  a filter head having a filter coupling portion for coupling the filters thereto,
  wherein the cleaning agent introduction is performed by replacing one of the filters by a cleaning agent vessel including the cleaning agent stored therein, and then by coupling the cleaning agent vessel to the filter coupling portion,
  wherein the cleaning agent introduction unit comprises:
an introduction instruction portion for instructing introduction of the cleaning agent into the water tank unit;
an introduction completion input portion for inputting a cleaning agent introduction completion signal from outside after the cleaning agent introduction is performed by replacing one of the filters by the cleaning agent vessel; and
a cleaning agent introduction controller for transmitting the cleaning agent introduction completion signal to the cleaning unit when the cleaning agent introduction completion signal is input by the introduction completion input portion,
wherein the cleaning unit comprises a cleaning controller for transmitting a signal to the rinsing unit after the cleaning water has been completely discharged out.

2. The water purifying apparatus of claim 1, wherein the discharging unit comprises:
a discharging guide portion selectively communicated with the water tank unit or the extraction unit, for guiding the remaining water, the cleaning water or the rinsing water to be discharged out; and
an opening/closing portion for selectively opening or closing the discharging guide portion.

3. The water purifying apparatus of claim 1, wherein the discharging unit is implemented as a discharging pipe coupled to an end of an extraction opening of the extraction unit.

4. The water purifying apparatus of claim 1, wherein the remaining water discharging unit comprises:
a remaining water sensor for sensing whether there is remaining water or not;
a remaining water discharge button portion for starting discharge of the remaining water by generating a remaining water discharge signal; and
the remaining water discharge controller for activating the remaining water discharge button portion when there is remaining water.

5. The water purifying apparatus of claim 1, wherein the remaining water discharging unit further comprises a remaining water discharge informing portion for informing discharge completion of the remaining water by sound.

6. The water purifying apparatus of claim 1, wherein the cleaning agent introduction controller is configured to sense introduction of the cleaning agent by a weight sensor provided at the water tank unit.

7. The water purifying apparatus of claim 1, wherein the cleaning agent introduction controller is configured to sense introduction of the cleaning agent through an introduction completion input portion for inputting introduction completion of the cleaning agent from outside.

8. The water purifying apparatus of claim 1, wherein the cleaning unit comprises:
a cleaning water level sensor for sensing a level of the cleaning water stored in the water tank unit; and
the cleaning controller for controlling water supply and disconnection until the cleaning water reaches a predetermined level, for discharging the cleaning water by sensing lapse of a preset time after the cleaning water has reached the predetermined level.

9. The water purifying apparatus of claim 8, wherein the cleaning water level sensor is implemented as one of a reed level sensor, a resistance sensor, a piezoelectric sensor, an ultrasonic sensor, an electrode sensor, and an infrared ray sensor.

10. The water purifying apparatus of claim 8, wherein the cleaning water level sensor comprises:
a flow amount sensor for sensing a flow amount of the cleaning water supplied to the water tank unit; and
a water level calculator for calculating a level of the cleaning water by sensing a supply duration of the cleaning water.

11. The water purifying apparatus of claim 1, wherein the rinsing unit comprises:
a rinsing water level sensor for sensing a level of the rinsing water stored in the water tank unit; and
a rinsing controller for controlling water supply and disconnection until the rinsing water reaches a predetermined level, and for discharging the rinsing water by sensing lapse of a preset time after the rinsing water has reached the predetermined level.

12. The water purifying apparatus of claim 11, wherein the rinsing unit further comprises a concentration sensor for sensing a concentration of the cleaning agent included in the rinsing water.

13. The water purifying apparatus of claim 12, wherein the rinsing controller is configured to repeatedly perform a rinsing process until a concentration of the cleaning agent sensed by the concentration sensor becomes less than a preset concentration.

14. The water purifying apparatus of claim 1, wherein the filtering unit further comprises:
flow paths in the filter head for guiding water supplied to or discharged from the filters.

15. The water purifying apparatus of claim 14, wherein the filter and the filter coupling portion are formed in plurality, respectively, and wherein bypass caps coupled to the filter coupling portions to which the cleaning agent vessel has not been coupled, and communicating the flow paths with each other.

16. The water purifying apparatus of claim 15, wherein the cleaning agent vessel is coupled to an uppermost filter coupling portion in a flow direction of the water.

* * * * *